United States Patent Office 3,000,885
Patented Sept. 19, 1961

3,000,885
2-ACYL-10-OXYALKYLPIPERIDINOALKYL-
PHENOTHIAZINES AND PROCESS
John W. Cusic, Skokie, Ill., assignor to G. D. Searle & Co., Chicago, Ill., a corporation of Delaware
No Drawing. Filed Aug. 7, 1958, Ser. No. 753,611
11 Claims. (Cl. 260—243)

This invention relates to 2-acyl-10-oxyalkylpiperidino-alkylphenothiazines and a process for the manufacture thereof. More particularly, this invention relates to compounds of the formula

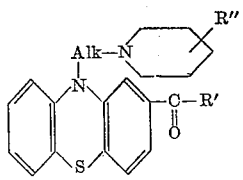

wherein R′ represents an alkyl radical; R″ represents an alkyl radical substituted by 1 or a plurality of hydroxy, alkanoloxy, alkoxy, and/or alkenyloxy radicals; and Alk represents an alkylene radical.

Among the alkyl radicals comprehended by R′ in the foregoing formula, especially lower alkyl groupings are preferred. Examples of such radicals are methyl, ethyl, propyl, isopropyl, butyl, isobutyl, sec-butyl, tert-butyl, pentyl, isopentyl, tert-pentyl, neopentyl, hexyl, isohexyl, heptyl, octyl, and homologous monovalent hydrocarbon radicals embracive of fewer than 9 carbon atoms arranged in chains, either straight or branched.

The substituted alkyl radicals designated R″ in the formula likewise are desirably of lower order, and may be thought of as derived by replacing, in an alkyl radical comprising up to and including 8 carbon atoms, an apposite number of hydrogen atoms with at least 1 hydroxy, lower alkanoyloxy, lower alkoxy, or lower alkenyloxy grouping. Illustrative of the hydroxy(lower alkyl) and lower alkanoyloxy(lower alkyl) radicals within the purview of R″ are such as 2-hydroxyethyl, 2-hydroxypropyl, 1-(hydroxymethyl)propyl, 1,1-di(hydroxymethyl)propyl, 2,3-dihydroxypropyl, 3-hydroxybutyl, 5-hydroxypentyl, and corresponding groupings wherein some or all of the hydroxyls present are esterified with a lower alkanoic acid—i.e., one containing fewer than 9 carbon atoms—or its equivalent. Typical of the lower alkoxy(lower alkyl) and lower alkenyloxy(lower alkyl) radicals symbolized by R″ are methoxyethyl, ethoxyethyl, propoxyethyl, allyloxyethyl, methoxypropyl, butoxypropyl, methylallyloxybutyl, and the like. It follows that the alkoxy substituents embodied by R″ are especially those of the formula —O-lower alkyl and the alkenyloxy radicals similarly adapted are identical therewith except for the presence of a single double bond. Sometimes both ether and alcohol functions, the latter being esterified on occasion, are optimally present in the moiety represented by R″. Further, as will be apparent to those skilled in the art from the structural formula in the first paragraph of this specification, the point of attachment of R″ in the piperidine nucleus is unrestricted, alpha, beta, or gamma positioning alike being within the ambit of invention set forth.

The alkylene radicals contemplated by Alk in the formula for compounds of this invention are particularly lower alkylene radicals containing more than 1 carbon atom, for example, ethylene, trimethylene, 1,2-propylene, tetramethylene, 2,2-dimethyl-1,3-propylene, and like bivalent saturated acyclic straight- or branched-chain hydrocarbon groupings of empirical formula $C_nH_{2n}$ wherein $n$ is a small positive integer amounting to more than 1.

Equivalent to the basic amines of this invention for the purposes here described are non-toxic acid addition and quaternary ammonium salts thereof, the compositions of which may be symbolized by

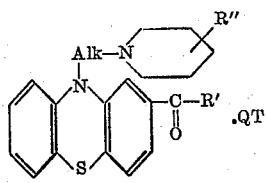

wherein R′, R″, and Alk have the meanings hereinbefore assigned; Q is selected from among hydrogen and lower alkyl, hydroxy(lower alkyl), and lower alkenyl radicals, as also such aralkyl radicals as benzyl, phenethyl, and naphthylmethyl; and T is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The compounds to which this invention relates are useful because of their valuable pharmacological properties. Like other basic phenothiazines superficially related, they appear to depress the central nervous system; but their effectiveness in producing this response, as evidenced by the tranquility, ataraxia and relaxation attributable thereto, is far beyond what one would be led to expect from the teachings of the prior art. Thus, for example, 2-acetyl-10 - {3 - [p - (2 - hydroxyethyl)piperidino] - propyl}phenothiazine, a preferred embodiment of the present invention, tranquilizes at ⅒ the dose necessary to achieve a comparable result with the corresponding 2-chloro compound, and is 5 times more potent in this respect than 1-[3 - (2 - acetyl - 10 - phenothiazinyl)propyl] - 4 - (2 - hydroxyethyl)piperazine, a compound wherein nitrogen replaces carbon in the gamma position of the piperidine ring. Similarly, 2-acetyl-10-{3-[p - (3 - hydroxypropyl)-piperidino]propyl}phenothiazine, the product of Example 6 hereinafter, potentiates barbiturate sleeping time, another index of CNS activity, at ⅒ the dose characteristic of the 2-chloro analog.

Other useful properties of the subject compositions include hypotensive and anti-inflammatory activity, the latter property being specifically illustrated by, but not limited to, an inhibitory effect on the edema formation characteristic of inflammatory states.

The compounds herein disclosed can be variously obtained; but a preferred procedure comprises contacting for as long as several hours at elevated temperatures and in an inert solvent a 2-acyl-10-haloalkylphenothiazine of the formula

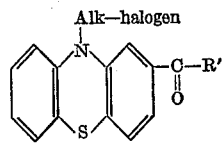

with a piperidine of the formula

R' and R" having the meanings hereinbefore assigned. Suitable solvents are ethanol, butanone, toluene, dimethylformamide and the like, a representative set of conditions for the contemplated preparations being 12 or more hours at reflux temperatures in butanone medium. An acid acceptor such as potassium carbonate and a catalyst such as sodium iodide may be incorporated in the reaction mixture if desired. Alternatively, the esters of this invention can be derived by treatment of the corresponding alcohols with appropriately selected acid chlorides.

Conversion of the amine bases hereof to corresponding acid addition salts is accomplished by simple admixture of these compounds with 1 equivalent of any of various inorganic and strong organic acids, the anionic portion of which conforms to T as hereinabove defined.

The quaternary ammonium compounds comprehended by this invention are those derived by contacting a claimed base with 1 equivalent of an organic ester of the formula $$Q—T$$

Q and T being limited by the meanings hereinbefore assigned, and it being additionally provided that Q is not hydrogen. Quaternization takes place in the temperature range between 25° and 100° centigrade, using an inert solvent such as chloroform, acetone, butanone, methanol, butanol, or the like as reaction medium. Quaternization is ordinarily completed in from 1 to 48 hours and is generally carried out in a closed system if the lower alkyl halide—such as methyl chloride—is one of the reagents. Using methyl bromide, the manufacture of quaternary salts may be smoothly effected in butanone solution at 70° centigrade, the reaction time being approximately 1 hour.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in millimeters of mercury, and relative amounts of materials in parts by weight, except as otherwise noted.

Example 1

A. *10-(β-chloroethyl)-2-[2'-(2'-methyl-1',3'-dioxolanyl)]phenothiazine.*—To a solution of 152 parts of 2-[2'-(2'-methyl-1',3'-dioxolanyl)]phenothiazine in 2100 parts of anhydrous ether is added a 10% molar excess of butyllithium in 315 parts of anhydrous ether, following which there is introduced 141 parts of 2-chloroethyl p-toluenesulfonate. The resulting mixture is heated at the boiling point under reflux for 4 hours, then decomposed with water and consecutively washed with dilute aqueous hydrochloric acid, water, dilute aqueous potassium hydroxide, and water, in that order. The mixture is thereupon dried over anhydrous potassium carbonate and finally stripped of solvent by vacuum distillation. The product thus obtained is the desired ketal, namely, 10-(β-chloroethyl)-2-[2'-(2'-methyl-1',3'-dioxolanyl)]phenothiazine.

B. *2-acetyl-10-{2-[γ-(3-hydroxypropyl)piperidino]ethyl}phenothiazine.*—A mixture of 215 parts of the ethylene ketal of 2-acetyl-10-(β-chloroethyl)phenothiazine described in the preceding Part A of this example, 90 parts of 4-(3-hydroxypropyl)piperidine, 40 parts of potassium hydroxide, 30 parts of sodium iodide, and 3500 parts of butanone is heated at the boiling point of the solvent present for 12 hours under reflux, whereupon the mixture is filtered and then stripped of solvent by vacuum distillation. The residue is taken up in benzene, and the benzene solution is washed first with dilute aqueous potassium hydroxide and thereafter several times with water. Upon distillation of solvent, there remains as the residue the desired 2-acetyl-10-{2-[γ-(3-hydroxypropyl)piperidino]ethyl}phenothiazine, the formula of which is

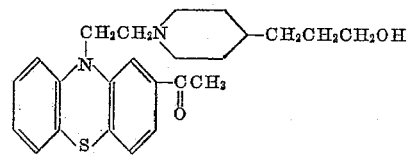

Example 2

A. *2-acetyl-10-(3-chloropropyl)phenothiazine.*—A mixture of 200 parts of 2-acetylphenothiazine, 55 parts of 85% potassium hydroxide, 131 parts of 1-bromo-3-chloropropane, and 3200 parts of butanone is heated at the boiling point of the solvent under reflux for 3 hours. There is then introduced an additional 55 parts of 85% potassium hydroxide and 131 parts of 1-bromo-3-chloropropane, following which boiling under reflux is resumed for 6 more hours. At this point the reaction mixture is filtered and stripped of solvent by vacuum distillation. The residue is taken up in a mixture of xylene and ether; and the resultant solution is washed with water, then dried over anhydrous potassium carbonate, and finally distilled free of solvent. The product which remains is 2-acetyl-10-(3-chloropropyl)phenothiazine.

B. *2-acetyl-10-{3-[γ-(hydroxymethyl)piperidino]-propyl}phenothiazine.*—A mixture of 100 parts of 2-acetyl-10-(3-chloropropyl) phenothiazine, 90 parts of 4-(hydroxymethyl) piperidine hydrochloride, 63 parts of potassium hydroxide, 30 parts of sodium iodide, and 3200 parts of a 1:1 mixture of ethanol and butanone is heated at the boiling point under reflux for 12 hours. The mixture is worked up as detailed in Example 1B above to yield 2-acetyl-10-{3-[γ-(hydroxymethyl)piperidino]propyl}phenothiazine, the formula of which is

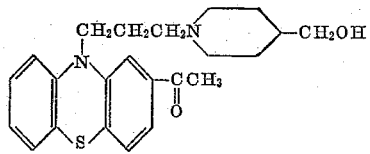

Example 3

*2-acetyl-10-{3-[α-(2-hydroxyethyl)piperidino]propyl}phenothiazine.*—Substitution of 100 parts of 2-(2-hydroxyethyl) piperidine hydrochloride for the 90 parts of 4-(hydroxymethyl)piperidine hydrochloride called for in Example 2B affords, by the procedure described therein, 2-acetyl-10-{3-[α-(2-hydroxyethyl)piperidino]propyl}phenothiazine, of the formula

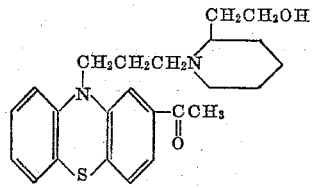

Example 4

A. *2-acetyl-10-{3-[γ-(2-hydroxyethyl)piperidino]propyl}phenothiazine.*—To a solution of 630 parts of 2-acetyl-10-(3-chloropropyl)phenothiazine in 3200 parts of butanone is added 256 parts of 4-(2-hydroxyethyl)piperidine, 280 parts of freshly ground potassium carbonate, and 75 parts of sodium iodide washed in with 4000 parts of butanone. The resultant mixture is heated with agitation at the boiling point under reflux for 10½ hours, whereupon it is chilled and filtered. The filtrate is stripped of solvent by evaporation and the residue washed to neutrality with water, then taken up in benzene. Distillation of solvent removes traces of moisture and leaves as a residue 2-acetyl-10-{3-[γ-(2-hydroxyethyl)piperidino]propyl}phenothiazine. The product has the formula

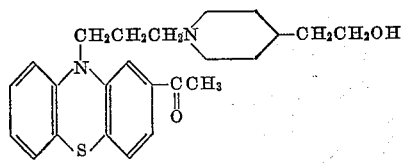

B. *2 - acetyl - 10 - {3 - [γ - (2 - hydroxyethyl)piperidino]propyl}phenothiazine hydrochloride.*—To an anhydrous solution of the base of the foregoing Part A of this example, diluted with anhydrous ether, is added a slight excess of hydrogen chloride dissolved in 2-propanol. The precipitate thrown down is collected on a filter and dissolved in water. The resultant aqueous solution is washed with benzene and then made alkaline, reprecipitating the base, which is taken up in pure benzene. This benzene solution is washed to neutrality with water and then extracted with dilute aqueous hydrogen chloride. The acid extract is washed with benzene and then made alkaline as before. The base thus again precipitated is taken up in benzene, and the resultant solution is washed to neutrality with water and then dried over anhydrous potassium carbonate. This purified benzene extract of the base is then diluted with anhydrous ether, following which a slight excess of hydrogen chloride in 2-propanol is introduced. The precipitate thrown down is the desired 2 - acetyl - 10 - {3 - [γ - (2 -hydroxyethyl)piperidino]propyl}phenothiazine hydrochloride, which melts in the range 100–110°, with preliminary softening at 90–100°.

*Example 5*

*10 - {3 - [γ - (1 - hydroxyethyl)piperidino]propyl} - 2-propionylphenothiazine.*—A mixture of 133 parts of 10-(3 - chloropropyl) -2 - propionylphenothiazine, 80 parts of 4-(1-hydroxyethyl)piperidine, 32 parts of potassium hydroxide, 30 parts of sodium iodide, and 3200 parts of butanone is heated at the boiling point of the solvent under reflux for 12 hours, then filtered and stripped of solvent by vacuum distillation. The oily residue is taken up in benzene, and the benzene solution is consecutively washed with dilute aqueous potassium hydroxide and copious quantities of water. Solvent and residual moisture is removed by distillation, leaving 10-{3-[γ-(1-hydroxyethyl)piperidino]propyl} - 2 - propionylphenothiazine, the formula of which is

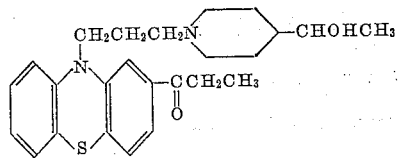

*Example 6*

*10 - {3 - [γ - (2 - hydroxyethyl)piperidino]propyl} - 2-propionylphenothiazine.*—A mixture of 330 parts of 10-(3-chloropropyl)-2-propionylphenothiazine, 63 parts of poatassium hydroxide, 50 parts of sodium iodide, 200 parts of 4-(2-hydroxyethyl)piperidine, and 3200 parts of butanone is heated at the boiling point under reflux for 12 hours. Work-up in accordance with the technique of Example 1B affords as the product, 10-{3-[γ-(2-hydroxyethyl)piperidino]propyl} - 2 - propionylphenothiazine, which has the formula

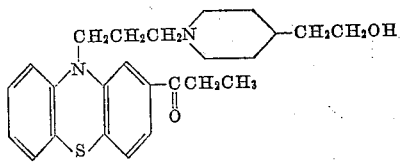

*Example 7*

*2 - acetyl - 10 - {3 - [β - (3 - hydroxypropyl)piperidino]propyl}phenothiazine.*—A mixture of 127 parts of 2-acetyl-10-(3-chloropropyl)phenothiazine, 30 parts of sodium iodide, 108 parts of 3-(3-hydroxypropyl)piperidine hydrochloride, 100 parts of potassium hydroxide, and 4000 parts of butanone is heated at the boiling point of the solvent under reflux for 12 hours. Using the procedure detailed in Part B of Example 1 hereinbefore, the resultant mixture is worked up to give the desired 2 - acetyl - 10 - {3 - [β - (3 - hydroxypropyl)piperidino]propyl}phenothiazine, of the formula

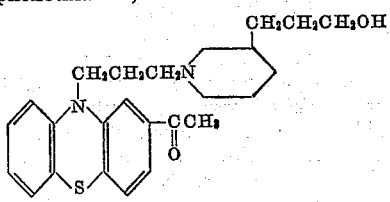

*Example 8*

A. *2-acetyl-10 - {3-[γ - (3-hydroxypropyl)piperidino]propyl}phenothiazine.*—A mixture of 150 parts of 2-acetyl-10-(3-chloropropyl)phenothiazine, 85 parts of 4-(3-hydroxypropyl)piperidine hydrochloride, 64 parts of 85% potassium hydroxide, 30 parts of sodium iodide, and 3200 parts of butanone is heated at the boiling point under reflux for 12 hours. The mixture is then filtered, and the filtrate is freed of solvent at the water pump. The oil which remains is dissolved in chloroform; and this solution is washed with water, dried over anhydrous potassium carbonate, and finally distilled. The orange oil coming over at 190–200° under 0.3 mm. pressure is the desired 2-acetyl-10-{3-[γ-(3-hydroxypropyl)-piperidino]propyl}phenothiazine, of the formula

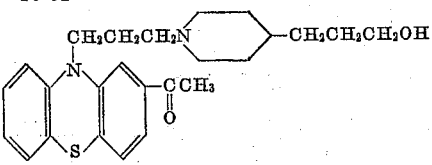

B. *2 - acetyl - 10 - {3 - [γ - (3 - hydroxypropyl)-piperidino]propyl}phenothiazine hydrochloride.* — A solution of the base of the foregoing Part A of this example in anhydrous ether is treated with a slight excess of hydrogen chloride in 2-propanol. The bright yellow precipitate which results is separated by filtration and dried over phosphorus pentoxide. The product darkens and decomposes at temperatures between 70° and 172°, finally melting at 172–175°. This material is 2-acetyl-10 - {3 - [γ-(3-hydroxypropyl)piperidino]propyl}phenothiazine hydrochloride.

C. *2 - acetyl - 10 - {3 - [γ - (3 - hydroxypropyl)-piperidino]propyl}phenothiazine citrate.*—To a solution of 61 parts of anhydrous citric acid in a mixture of 4900 parts of anhydrous ether and 80 parts of absolute ethanol is added, with agitation, a solution of 135 parts of the base of the preceding Part A of this example in approximately 1000 parts of anhydrous ether. A yellow precipitate is thrown down. The precipitate is recovered on a filter and dried at 80–90°. The product thus obtained is 2-acetyl - 10 - {3-[γ-(3-hydroxypropyl)piperidino]propyl}phenothiazine citrate.

D. *2 - acetyl - 10 - {3 - [γ - (3 - hydroxypropyl)-piperidino]propyl}phenothiazine 8 - chlorotheophyllinate.*—To a solution of 85 parts of the base of the preceding Part A of this example in 2000 parts of acetone is added a solution of 42 parts of 8-chlorotheophylline in 2000 parts of acetone. There is then introduced sufficient pentane (approximately 3000 parts) to effect precipitation. The precipitate is filtered off and recrystallized from butanone. There results 2-acetyl-10-{3-[γ-(3-hydroxypropyl)piperidino]propyl}phenothiazine 8 - chlorotheophyllinate in the form of small rods, melting at 182–184°.

*Example 9*

A. *10 - (3-chloropropyl) - 2-propionylphenothiazine.* —

Using the procedure of Example 2A, but substituting an equivalent quantity of 2-propionylphenothiazine for the 2-acetylphenothiazine called for therein, one obtains 10-(3-chloropropyl)-2-propionylphenothiazine.

B. *10 - {3 - [γ - (3-hydroxypropyl)piperidino]propyl}-2-propionylphenothiazine.*—A mixture of 13 parts of 10-(3-chloropropyl)-2-propionylphenothiazine, 7 parts of 4-(3-hydroxypropyl)piperidine, 3 parts of potassium hydroxide, 3 parts of sodium iodide, and 320 parts of butanone is heated at the boiling point of the solvent under reflux for 12 hours. The mixture is then filtered, and the filtrate is stripped of solvent by vacuum distillation. The oil which remains is taken up in benzene, and the benzene solution is washed first with dilute aqueous potassium hydroxide, then several times with water. The solution is then extracted with dilute aqueous hydrochloric acid; and this solution, in turn, is washed with ether and then made basic with dilute aqueous potassium hydroxide. The oil which separates is extracted with benzene; and this benzene solution is washed several times with water, dried over anhydrous potassium carbonate, and stripped of solvent by vacuum distillation. Heating at temperatures of the order of 75° under 0.5 mm. pressure serves to remove the last traces of volatile contaminants. 10 - {3-[γ - (3-hydroxypropyl)piperidino]propyl}-2-propionylphenothiazine is thus obtained as an orange oil. The product has the formula

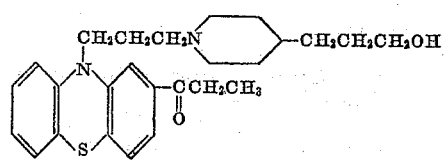

Example 10

A. *2 - butyryl - 10 - (3 - chloropropyl)phenothiazine.* — Using the procedure of Example 2A, but substituting an equivalent quantity of 2-butyrylphenothiazine for the 2-acetylphenothiazine called for therein, one obtains 2-butyryl-10-(3-chloropropyl)phenothiazine.

B. *2 - butyryl - 10 - {3 - [γ - (3-hydroxypropyl)-piperidino]propyl}phenothiazine.* — A mixture of 133 parts of 2-butyryl-10-(3-chloropropyl)phenothiazine, 72 parts of 4-(3-hydroxypropyl)piperidine, 32 parts of potassium hydroxide, 30 parts of sodium iodide, and 3200 parts of butanone is heated at the boiling point of the solvent present under reflux for 12 hours. Work-up in accordance with the technique of Example 1B affords as the product, 2-butyryl-10-{3-[γ-(3-hydroxypropyl)-piperidino]propyl}phenothiazine, the formula of which is

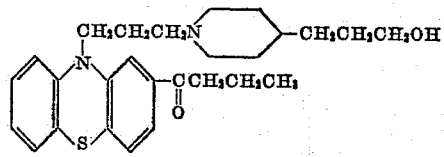

Example 11

*10 - {3-[γ - (3 - acetoxypropyl)piperidino]propyl}-2-acetylphenothiazine.*—To 5 parts of the base of the preceding Example 8A with 5 parts of triethylamine in 210 parts of anhydrous ether is added 2 parts of acetyl chloride. The resultant solution is let stand at room temperatures overnight and then filtered. The filtrate is consecutively washed with dilute aqueous potassium carbonate and water, following which it is dried over anhydrous potassium carbonate and freed of solvent by evaporation. Residual volatile contaminants are removed by heating at 80° under 0.5 mm. pressure. The orange oil thus obtained is 10-{3-[γ-(3-acetoxypropyl)piperidino]propyl}-2-acetylphenothiazine, of the formula

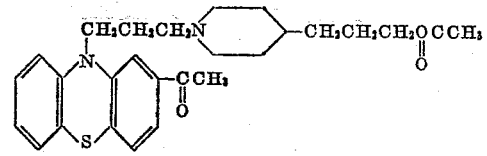

What is claimed is:
1. A compound of the formula

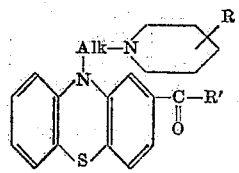

wherein R is a lower alkyl radical solely substituted by a member of the group consisting of hydroxy and lower alkanoyloxy radicals, Alk is a lower alkylene radical containing more than 1 carbon atom and separating the radicals attached thereto by at least 2 carbon atoms, and R' is a lower alkyl radical.

2. A compound of the formula

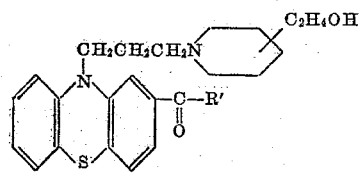

wherein R' is a lower alkyl radical.

3. A compound of the formula

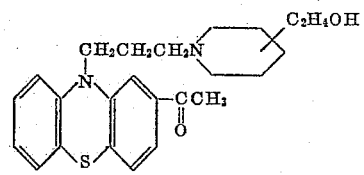

4. 2-acetyl-10 - {3-[α-(2-hydroxyethyl)-piperidino]propyl}phenothiazine.

5. 2-acetyl - 10-{3-[γ-(2-hydroxyethyl)-piperidino]propyl}phenothiazine.

6. A compound of the formula

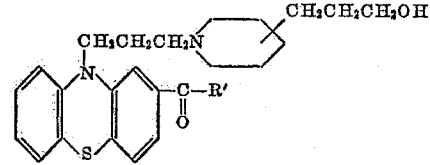

wherein R' is a lower alkyl radical.

7. A compound of the formula

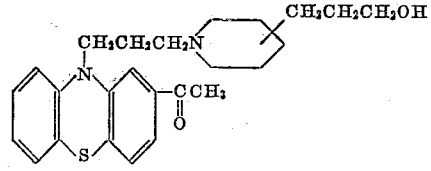

8. 2-acetyl-10-{3-[β-(3-hydroxypropyl)piperidino]propyl}phenothiazine.

9. 2-acetyl - 10-{3-[γ-(3-hydroxypropyl)piperidino]propyl}phenothiazine.

10. 10-{3-[γ-(3-hydroxypropyl)piperidino]-propyl}-2-propionylphenothiazine.

11. 10-{3-[γ-(3-acetoxypropyl)piperidino]propyl}-2-acetylphenothiazine.

References Cited in the file of this patent

UNITED STATES PATENTS

| | | |
|---|---|---|
| 2,512,520 | Cusic | June 20, 1950 |
| 2,534,237 | Cusic | Dec. 19, 1950 |
| 2,676,971 | Cusic | Apr. 27, 1954 |
| 2,766,235 | Cusic | Oct. 6, 1956 |

OTHER REFERENCES

Delay: Chem. Abst., vol. 52, p. 18899, November 10, 1958, citing Presse med. 65, pp. 491–493 (1957).

Schmitt: Compt. rendu, vol. 244, pp. 255–258 (January 1957).